UNITED STATES PATENT OFFICE.

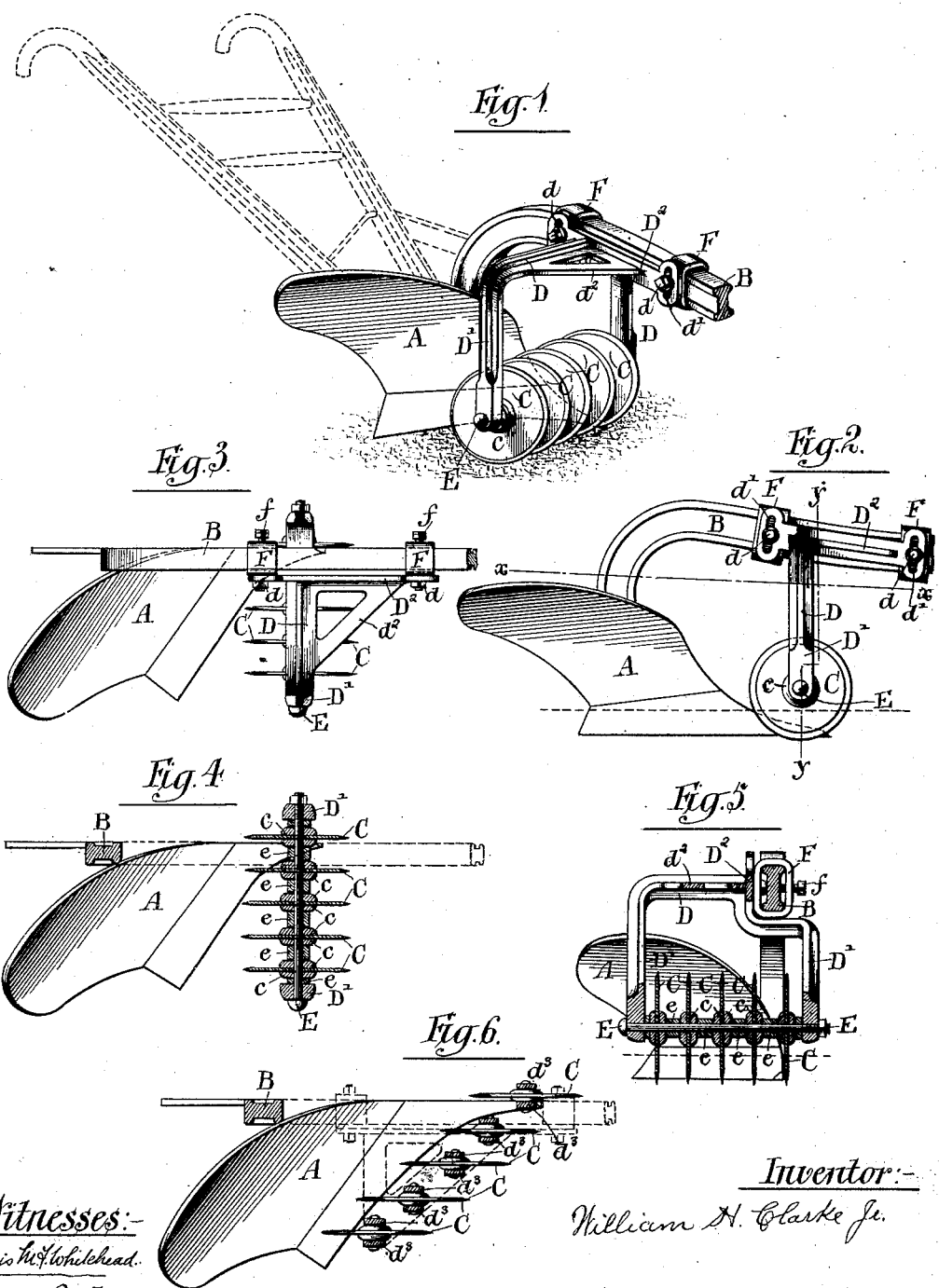

WILLIAM H. CLARKE, JR., OF CHICAGO, ILLINOIS, ASSIGNOR OF ONE-THIRD TO C. CLARENCE POOLE, OF SAME PLACE.

PLOW.

SPECIFICATION forming part of Letters Patent No. 333,601, dated January 5, 1886.

Application filed February 3, 1885. Serial No. 154,810. (No model.)

*To all whom it may concern:*

Be it known that I, WILLIAM H. CLARKE, Jr., of Chicago, in the county of Cook and State of Illinois, have invented certain new and useful Improvements in Plows; and I do hereby declare that the following is a full, clear, and exact description thereof, reference being had to the accompanying drawings, and to the letters of reference marked thereon, which form a part of this specification.

This invention relates to an improvement in plows or attachments therefor; and it consists in the matters hereinafter described, and pointed out in the appended claims.

A device embodying my invention consists, generally, in an attachment for a plow comprising a series of rotatory cutting-disks or colters, which are located in front of the plow or plowshare, and are constructed to cut or penetrate the ground in advance of the plowshare, in the forward movement of the latter, so as to divide the sod or soil into a series of relatively narrow strips. The said cutting-disks or colters may be used in connection with an ordinary hand-plow, a sulky-plow, or a plow of any other character, and said disks or colters may be supported in any desired or preferred manner. In an ordinary "breaking" or "stubble" plow, for instance, said disks may be supported in suitable bearings in a bracket attached to the beam thereof, and in a sulky-plow they may be supported either from the beam or axle, or from other part of the frame, as desired. The said cutting-disks or colters will usually, however, be arranged with reference to the share, in the same manner as an ordinary colter—that is to say, they will be so placed that when the plow is in position for operation their lower edges will be approximately in the same horizontal plane as the cutting-edge or lower surface of the plowshare, and they will preferably be placed near the cutting-edge of the share, so that they will not be allowed to rise out of the ground by the lifting of the front end or point of the plow. One of said disks or colters—that adjacent to the point of the plow—will usually correspond in position with the single rolling colter heretofore usually used, and will operate to divide the soil at the land side of the furrow in a well-known manner.

Any desired number of the cutting-disks or colters may be used, depending upon the fineness with which it is desired to divide the sod or ground. Usually, however, they will be arranged at from three to six inches apart, and will preferably be located side by side and at equal distance apart, and will be mounted to rotate independently of each other. The cutting-disks or colters described will be especially valuable for use in connection with a breaking-plow in the first plowing of sod or grass land, but will be valuable also in after-cultivation, especially in hard or clayey soils. In the operation of breaking up grass land, as usually practiced in the first plowing, the sod is cut in long strips the width of the furrow and turned over. When the land is again plowed, and cross-plowing is resorted to, as is generally the case, these strips are cut transversely and again turned over, thus leaving square pieces of sod, the dimensions of which are equal to the width of the plow, usually from twelve to sixteen inches. These squares of sod, especially in the new lands of the West, are very difficult to disintegrate, and it often becomes necessary to go over the ground thus prepared by plowing five or six times with a harrow before the soil is sufficiently pulverized for the raising of any kind of grain. The difficulty of breaking up or disintegrating the relatively large masses or lumps of sod thus formed is well understood, and a relatively small or narrow plow is often used in breaking up new land, with great disadvantage in point of speed, in order that the strips or squares into which the sod is cut in plowing and cross-plowing shall be relatively small, and may thereby be more readily broken up by harrowing or other after-cultivation.

In the use of a series of cutting-disks or colters located in advance of the plow, as above described, the sod in the first plowing will obviously be separated into a series of relatively narrow strips, which strips will be turned over by the plow, so as to bring the top of the sod downward, and thereby cause it to become rotted in the usual manner. In case the land thus plowed is "backset" or plowed again with furrows running in the same direction as in the first plowing, the said strips, in being again turned, will be broken up and separated, so that their complete disintegration in after-cultivation will be rendered comparatively easy. When cross-plowing is resorted to, which is the preferable method when a series of revolving cutters are used, the strips which are severed and turned over in the first plowing will be further divided into small squares, which may be readily broken up and pulverized by a relatively small amount of harrowing or other after-cultivation. It is thus apparent that by the means described new or uncultivated ground may be prepared for growing crops with much less labor than has heretofore in such cases been necessary.

The advantages obtained by the use of the disks or colters described in breaking up new land obtain to a great extent in the ordinary cultivation of land, inasmuch as by their use the ground is more thoroughly broken up and disintegrated in plowing, and much less labor is therefore required in after-cultivation.

The invention may be more fully understood by reference to the accompanying drawings, in which—

Figure 1 is a perspective view of a plow and a series of cutting-disks or colters illustrating my invention. Fig. 2 is a side elevation of the same. Fig. 3 is a plan view of the same. Fig. 4 is a sectional plan view taken upon line $x\ x$ of Fig. 2. Fig. 5 is a detail section through the cutting-disks and their support, taken upon line $y\ y$ of Fig. 2. Fig. 6 is a sectional plan of the plowshare and disks, showing a slightly-different position of the latter.

In the drawings, A is the plow, B is the beam, and C are the cutting-disks or colters. The plow and beam shown may belong to any ordinary plow, and may have the usual handles, as shown in dotted lines in Fig. 1, or they may form parts of a sulky-plow.

In the device herein shown, as one practical way of carrying out my invention, the rotating disks or colters are pivotally supported in a bracket or casting, D, attached to the plow-beam B.

As shown in Figs. 1, 2, 3, 4, and 5, the colters C are supported in the bracket with their axes of rotation in the same line, whereby the colter remote from the beam is brought considerably in advance of the cutting-edge of the plowshare, and in Fig. 6 the colters are shown as arranged in an inclined line, so that they are all at approximately the same distance in advance of the cutting-edge of the share. The latter arrangement may in some cases be found to be the preferable one, for the reason that, all of the colters being close to the plow, they will have little tendency to lift the point thereof by riding over the ground, and the severing of the soil to a definite depth will be rendered more positive by the lifting of the latter into contact with the disks as it rises upon the inclined surface of the share below the colters. The form of the device shown in Fig. 6 has the disadvantage of making necessary a separate pivotal support for each disk, and for this reason the use of the form shown in the first five figures of the drawings will usually be preferred.

As illustrated in the figures last mentioned, the several disks, which are constructed with central hubs, $c$, riveted or otherwise secured at their central portions in a well-known manner, are mounted upon a single pivot-rod, E, which is held at its ends in the downwardly-extending arms D' of the bracket D. The disks may be held at a desired distance apart upon the rod E by means of short sleeves or thimbles $e$, as shown, this construction affording a simple means of removing and replacing the disks when required for renewal or repairs. By this construction, also, a convenient means is afforded for changing the number or distance apart of the disks, this being readily accomplished by substituting thimbles of the desired length between the disks in making such changes.

In order to enable the disks to be readily and accurately adjusted in position with reference to the cutting edge and point of the plow, the bracket D, as herein shown, is attached to the plow-beam as follows: The said bracket is provided with a part or extension, $D^2$, preferably in the form of a flat plate, which is extended along one side of the plow-beam, and is secured to the latter by means of clamp bars or straps F, which pass around the beam, and to which the plate or part $D^2$ is secured by bolts $d\ d$, inserted through the said straps and the end portions of the said plate $D^2$. The straps F may be held in position upon the beam by any suitable clamping device, bolts $f$, tapped through the straps and bearing against the side of the beam, being herein shown as used for this purpose.

In order to enable the bracket to be adjusted vertically, the apertures $d'$, for the bolts in the plate $D^2$, may be elongated vertically, as shown, and a horizontal adjustment of the brackets may be accomplished by shifting the straps F longitudinally upon the beam. In the use of this construction of the parts, therefore, by loosening the bolts, the bracket may be shifted bodily, either backward or forward, or vertically, upon the beam, and the colters thereby adjusted as desired. By raising or lowering one of the ends of the plate $D^2$, also, the lower ends of the arms D' may be shifted forward or back, if required, for the proper adjustment of the parts. Any usual or suitable means may be used for adjusting the bracket laterally upon the beam. The outer end of the horizontal arm of the bracket D is, as shown, united with the forwardly-projecting part of the plate $D^2$ by means of a brace, $d^2$, whereby a desired degree of rigidity is obtained in said arm.

When the colters are arranged in an inclined or oblique line, as shown in Fig. 6, a supporting-bracket, therefore, of the shape shown in dotted lines in said figure, may be employed, suitable depending arms, $d^3$, (shown in section in said figure,) in such case being used to separately support the several disks.

I am aware that rotating disks of conical or concave form have been used for breaking up or pulverizing the soil in cultivators and harrows, and I am also aware that in cultivators and similar devices teeth or blades have been used in various ways, in connection with plows or shovels, for a similar purpose. By the use, however, of a series of rotating or revolving cutting-disks sustained in front of a single plow, and constructed to cut or sever the soil in advance of the plow in its forward movement, I am enabled to obtain novel and valuable results, as above set forth, and I desire, therefore, to claim, broadly, such series of rotating cutting disks or colters, without restriction to the particular construction in the disks or colters, or in the means of supporting them, herein shown.

I claim as my invention—

1. In combination with a plow mold-board and share, a series of rotary cutting-disks or colters placed in front of the said share and mold-board, and a supporting arm or frame for said disks or colters, substantially as and for the purpose set forth.

2. The combination, with a plowshare, mold-board A, and plow-beam B, of the frame D and a series of rotary cutting-disks or colters, C, placed in front of the said share and mold-board, substantially as shown and described.

In testimony that I claim the foregoing as my invention I affix my signature in presence of two witnesses.

WILLIAM H. CLARKE, Jr.

Witnesses:
C. CLARENCE POOLE,
OLIVER E. PAGIN.